US009914642B2

(12) United States Patent
Arakelyan et al.

(10) Patent No.: US 9,914,642 B2
(45) Date of Patent: Mar. 13, 2018

(54) METHOD FOR PRODUCING HYDROGEN-CONTAINING GASEOUS FUEL AND THERMAL GAS-GENERATOR PLANT

(71) Applicant: Zakritoe akzionernoe obshestvo Nauchno-proektnoe prozodstvenno-stroitelnoe obedinenie "GRANDSTROY", Stavropol (RU)

(72) Inventors: Gamlet Gurgenovich Arakelyan, Stavropol (RU); Artur Gamletovich Arakelyan, Stavropol (RU); Grant Gamletovich Arakelyan, Stavropol (RU)

(*) Notice: Subject to any disclaimer, the term of this patent is extended or adjusted under 35 U.S.C. 154(b) by 0 days.

(21) Appl. No.: 14/980,797

(22) Filed: Dec. 28, 2015

(65) Prior Publication Data

US 2017/0144885 A1    May 25, 2017

Related U.S. Application Data

(62) Division of application No. 13/709,010, filed on Dec. 9, 2012, now Pat. No. 9,249,019.

(51) Int. Cl.
*C01B 3/34* (2006.01)
*B01J 19/24* (2006.01)

(52) U.S. Cl.
CPC .......... *C01B 3/34* (2013.01); *B01J 19/2415* (2013.01); *B01J 2219/00157* (2013.01); *C01B 2203/0216* (2013.01); *C01B 2203/0816* (2013.01)

(58) Field of Classification Search
CPC combination set(s) only.
See application file for complete search history.

(56) References Cited

U.S. PATENT DOCUMENTS

| | | | |
|---|---|---|---|
| 6,641,625 B1 * | 11/2003 | Clawson | B01J 8/0419 422/187 |
| 6,770,106 B1 * | 8/2004 | Okamoto | B01J 8/0242 48/127.9 |
| 2002/0114747 A1 | 8/2002 | Marchand et al. | |
| 2004/0047800 A1 * | 3/2004 | Sennoun | B01B 1/005 423/652 |
| 2004/0105794 A1 | 6/2004 | Maenishi et al. | |
| 2004/0146458 A1 | 7/2004 | Weissman et al. | |
| 2005/0089732 A1 | 4/2005 | Aoyams et al. | |
| 2006/0057444 A1 | 3/2006 | Takagi et al. | |

(Continued)

*Primary Examiner* — Imran Akram
(74) *Attorney, Agent, or Firm* — Yefim Kreydin

(57) ABSTRACT

The invention relates to a method for producing hydrocarbon-containing gaseous fuel comprises at least three stages. In the first stage water is entered for heating and water steam forming. In the second stage hydrocarbon component is entered and mixed with water steam by injecting. The mixture is heated and directed to subsequent stages to additional heating for fuel producing. Turbo generator is made as two cylinder tubes, divided on isolated sections. The first section is made with induction heat source for system start-up, the second section is made with injector type mixer. The inner tube cavity forms the firing chamber. In technological cylinder multistage components and mixture heated and additional heating in subsequent sections are realized until forming of hydrogen-containing gaseous fuel. Burning system, worker burner, start-up burner are installed on the firing chamber inlet. Working torch forming element is installed on the firing chamber outlet.

5 Claims, 3 Drawing Sheets

(56) References Cited

U.S. PATENT DOCUMENTS

| | | |
|---|---|---|
| 2007/0033872 A1 | 2/2007 | Simpkins et al. |
| 2007/0137104 A1 | 6/2007 | Kamijo et al. |
| 2009/0119990 A1 | 5/2009 | Jonson et al. |
| 2012/0277329 A1* | 11/2012 | Galloway ................ C10G 2/30 518/704 |
| 2014/0369897 A1* | 12/2014 | Verykios ................ B01J 8/0214 422/162 |

\* cited by examiner

METHOD FOR PRODUCING HYDROGEN-CONTAINING GASEOUS FUEL AND THERMAL GAS-GENERATOR PLANT

This application is the United States Divisional application of U.S. application Ser. No. 13/709,010 filed Dec. 9, 2012, the entire disclosure of which is incorporated herein by reference.

FIELD OF THE INVENTION

The invention relates to energy-saving technologies, mainly to methods and plants for converting water H2O into hydrogen-containing gas in the environment of catalyst medium from line of $C_nH_{2n+}2$ (diesel fuel, residual oil) during a continuous heat flame medium, when a burning temperature is above 500° C.

Most often such methods are referred to systems, in which gaseous fuel production and implementation by burning are combined into a single cycle, but they may be also used for accumulation of hydrogen-containing gas fuel.

BACKGROUND OF THE INVENTION

One method that is known is of generating hydrogen-containing gas (SU Pat No 1144977, 1985), where components are burned in a high temperature mode The disadvantage of the method is the high power consumption.

One method that is known is of a getting gas from hydrocarbon raw material (SU Pat No 939380, 1982), wherein water steam, superheated up to 430 degrees, is mixed with hydrocarbons as well as with a heating steam and gas mixture.

The disadvantage of the method consists in the necessity to apply an additional energy source to produce superheated steam and subsequent heating.

Another known method is an application of water steam in its various phase states, all of which are characterized by different equilibrium states (Soviet encyclopedic dictionary. M.: 1985, -p 962. Ref. "Steam").

Another known method is the "Method of producing hydrogen-containing gas in the turbo-generator setup>> (RU Pat. No 2269486, 2006).

This method and device for its implementation have the same purpose as the claimed technical solution while this method is characterized by sequence of operations, has several stages and is combined in a single closed cycle. The device corresponds with these stages.

Also in this method technical solution is realized in multistage method of producing of hydrogen-containing gaseous fuel with closed cycle, including process start-up in the mode of forced warm-up and realization of a self-heating process in the normal mode of self-heating, which includes mixing of the hydrocarbon component and water, their entering by pumping under the pressure, heating, fuel return and ignition.

In the known technical solution the initial mixing in liquid phase of water and hydrocarbon component at normal (20 degrees) temperature of components does not ensure stability of dispersed composition of the mixture, directed in the further on heating to produce fuel.

After cessation of mixing (i.e., from the moment of arriving the mixture to heat), reverse process starts it is the mixture lamination due to different densities of water and hydrocarbon component.

This leads to the heterogeneity of the mixture on the dispersed composition. During the subsequent heating of the mixture it is observed also heterogeneity of the temperature.

This heterogeneity is saved in the final product—the fuel mixture, directed to the torch ignition, causes torch burning instability. This happens due to formation of mixture local centers (on composition), where the mixture has no ability to burn. This causes disruption of ignition and extinction of the torch (which is typical for heavy hydrocarbon components). On the other side, there is formation in the mixture of local centers of rapid burning, which lead to unauthorized flash of flame in the torch, which is typical for light hydrocarbon components.

As for the known device, it includes relevant elements of the method realization, it is also inherent to the claimed technical solution.

Thermal gas generator setup is designed as a single device, which has a complex multi-section corps. This setup includes a burner system, firing chamber, device for mixing the components, ignition pulse device, pipes, and start-up system, which includes start-up burner with a supply of combustible fuel. The device has disadvantages, inherent to the implemented method, including failure occurrence in the process of production of fuel due to the heterogeneity of the mixture.

SUMMARY OF THE INVENTION

The technical problem consists of eliminating the disadvantages of the known technical solution, ensuring the stability of hydrogen-containing gaseous fuel production, decreasing of energy consumption, and hydrocarbon component discharge.

The technical result consists in obtaining a homogeneous phase state of the mixture in the process of fuel production and ensures the stability and constancy of the burning of technological firing torch and the working torch. This result also comprising increased safety of hydrogen-containing fuel, production including, reduction of the hydrocarbon component discharge.

This result is achieved by the following steps:

realizing of fuel production as a multi stages process, with closed cycle. This cycle has several stages. The first stage occurs when water is introduced and heated up to water steam formation. At later stages hydrocarbon component is introduced and mixed with water steam to form water steam and hydrocarbon mixture, entering separately, by pumping under pressure, the hydrocarbon component and water into the heated by firing torch technological cylinder, which is divided on isolated sections, number of which corresponds the number of fuel producing stages, additional heating, the mixture up to a temperature of forming of hydrogen-containing gaseous fuel, separating the fuel flow and directing one of its parts into ignition zone, to ensure firing torch burning and other part—for storing and/or external consuming, realizing start-up of process in the forced heating mode, and carrying out of process—in the normal mode of self-heating.

Processes of formation of hydrogen-containing gaseous fuel, in the normal mode of self-heating, is carried out with heating in three stages in the first stage water is introduced by pumping under the pressure of 0.3-0.5 MPa and it is heated up to the formation of water steam with a temperature of 500-550° C. In the second stage hydrocarbon component is introduced into the mixer by pumping under pressure of 0.3-0.5 MPa, this component is mixed with water steam in the mixer by injection under pressure of 0.06-0.25 MPa, at a ratio of water to hydrocarbon component from 10.5:1 to 8:1, and the mixture is heated up to a temperature of 1000-1100° C., at the third stage the mixture is heated up to a temperature of 1300-2000° C.

Ignition, in the normal mode of self-heating, is carried out by the ignition pulse unit with an external source—sparking generator, running with a frequency of 1-2 Hz.

Flow of gaseous fuel, in the normal mode of self-heating, is separated and directed one its part into igniting zone, to form the fire torch, and other part for storage and/or external consumption.

The process of formation and maintenance of the fire torch is carried out with a turbo charging.

At the process of start-up in a mode of forced heating first perform preliminary pumping of water in an amount of 40-50% of maximum amount of normal working volume under pressure 0.3-0.5 MPa. In the first stage heating is carried out until formation of a water steam at a temperature 450-500° C. Heating is carried out from an independent source of heat, such as, for example, induction heater.

Ignition of the steam and hydrocarbon mixture, or other fuel components, at start-up of the process in a forced heating mode is carried out from an independent source by ignition spark pulse device with an independent sparking source, which operates with a frequency of 40-50 Hz.

A thermal gas plant for hydrogen-containing gaseous fuel production with closed cycle comprising corpus, a burner system, firing chamber, unit for components mixing, pulse ignition unit, pipes and start-up system, including independent induction heat source, start-up burner with a supply of combustible fuel. The plant is equipped with fuel tanks, and made as separate sealed discharge containers for water and a hydrocarbon component, the corpus is made as a two cylindrical tubes, imbedded in one another with a gap, forming technological cylinder, divided on three isolated sections, so the section number correspond to number of stages of die process of making of fuel mixture, said cylinder concludes: the 1-st section with an independent induction source of heat, section corresponds to vaporization stage, 2-nd section of stage of components mixing and heating a steam and gas mixture, 3-d section of the additional heating stage for the fuel mixture producing, the inner tube cavity forms the firing chamber, unit for mixing is made as injector with separate inlets for water as a steam, and hydrocarbon component, with all that outlet of the last section of the technological cylinder is connected via pipe to the inlet of firing chamber, where a burner system is installed with ignition device with spark ignition pulse source, a working burner, start-up burner, while at the firing chamber outlet working torch is installed forming an element, as a restriction device, a discharge water container is connected via pipe to the inlet of a first section of the technological cylinder, an outlet of which is connected via pipe to 1-st inlet of injector, the second inlet of injector is connected via pipe to discharge container of hydrocarbon component, injector outlet is connected via pipe to the technological cylinder second section, connected via pipe to third section of technological cylinder.

A ratio of radii of tubes, forming the technological cylinder for fuel mixture producing is:

$$0.3 < (R1/r2) > 0.1:$$

Where R1—is an outer diameter of the inner tube, r2—is an inner diameter of outer tube The turbo charging unit is installed on the inlet of the burner system.

The constant overpressure of 0.3-0.5 MPa is supported in the discharge containers.

Figure 1A:
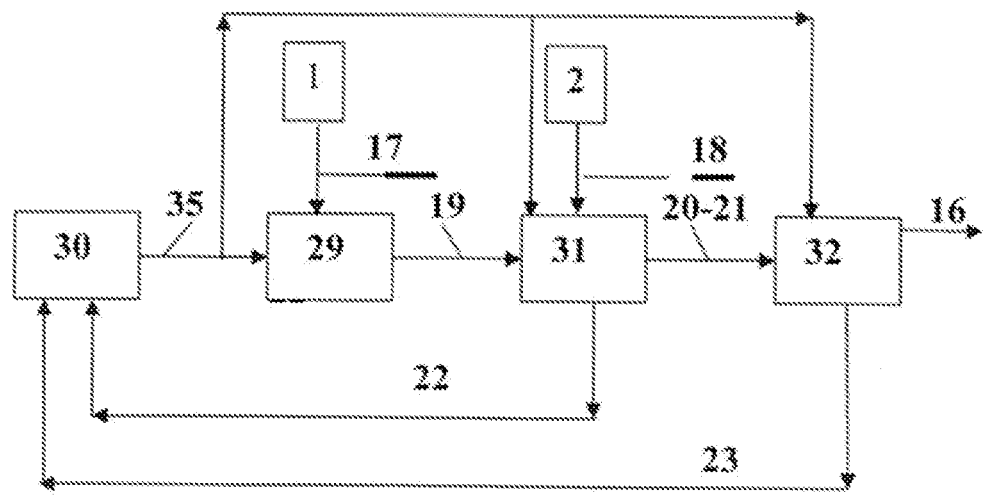
FIG. 1A shows block-diagram of the algorithm, realizing the method: generalized block-diagram of the algorithm

The following designations are used in all drawings:

1—discharge water container; 2—discharge container for hydrocarbon component $S_nH_{2n}+2$; 3—working burner; 4—startup burner; 5—external independent source-generator with pulsed spark igniter; 6—turbocharger unit; 7—induction (pin) heater of turbo generator startup; 8—injection type mixer; 9—fire chamber; 10—first section of the technological cylinder; 11—second section of the technological cylinder; 12—third section of technological cylinder; 13—zone of ignition; inflammation and fire torch formation; 14—zone of technological burning of firing torch (firing torch zone); 15—unit for forming the working torch, 16—working torch zone, 17—technological pipe for water supply by pumping from the discharge water container (1) into the first section (10) of technological cylinder; 18—technological pipe for supply hydrocarbon component $S_nH_{2n}+2$ by pumping from the discharge hydrocarbon container (2) into the injection type mixer (8); 19—technological pipe for steam supply from the first section (10) of technological cylinder into the injection type mixer (8); 20—technological pipe for steam and hydrocarbons mixture supply from the mixer (8) into the second section (11) of technological cylinder; 21—technological pipe for steam and hydrocarbons mixture supply from the second section (11) into the third section (12) of the technological cylinder; 22—technological pipe for steam and hydrocarbons mixture supply from the second section (11) into the start-up burner (4) (return of fuel in the forced heating mode); 23—technological pipe for fuel supply from the third section (12) of technological cylinder into working burner (3) (return of the fuel in the normal mode of self-heating); 24—pipe of fuel take-off for external fuel consumer; 25—control valve; 26—the place of water loading into the discharge container (1); 27—the place of hydrocarbon fuel loading into the discharge container (2): 28—devices for control the head and the pressure in the technological pipes; 29—water steam generation (realizing of process of water steam generation (1, 10) water supply from 1 into 10 for vaporization); 30—fire torch formation; 31—mixing and heating of the water steam and hydrocarbon mixture; 32—heating of the steam and hydrocarbon mixture for fuel producing; 33—inner cylinder of thermal gas generator; 34—outer cylinder of thermal gas generator: a)—supply of steam and hydrocarbon mixture from the second section (11) of the technological cylinder for running process, b)—supply of combustible mixture from an external source for running process, c—supply of hydrocarbon component for running process; 35—technological cylinder heating.

The corpus 36 is made single as two cylindrical tubes, imbedded in one another (33, 34), with a gap, forming technological cylinder.

The essence of the proposed method consists in the following:

The method and the setup realizes the dependence of $H_2O+S_nH_{2n+2}=H_n+CO_2$ in high-temperature multi-stage mode.

The thermal ability of carbon is best utilized at water gas.

On the vaporization of water gas of carbon it is requires 8% of its own resources, with all that the water gas consists mainly of CO (40-60%) and H2 (30-50%).

Water gas formation is a complex, at least two-stage process: at 500° C. it is a complete decomposition on hydrogen and carbon dioxide (C+2H2O=2H2+CO2, at 1000-1200° C.—it is a decomposition on hydrogen and carbon monoxide (CO2+C=2CO).

If the water is taken in a steam state, the decomposition of water steam (C+H2O=CO+H2) is accompanied by heat losses, and therefore leads to cooling. In relation to these, to compensate heat losses, temperature of the first stage of heating must be higher than temperature of final stage—it must be not less than 1300° C.

Presence of the turbo pumping (air, oxygen or other additional oxidant) gives a possibility to obtain so-called generator gas with a temperature of mixture burning of 1935° C., at actual absence on the output environmentally harmful components.

Figure 1B:
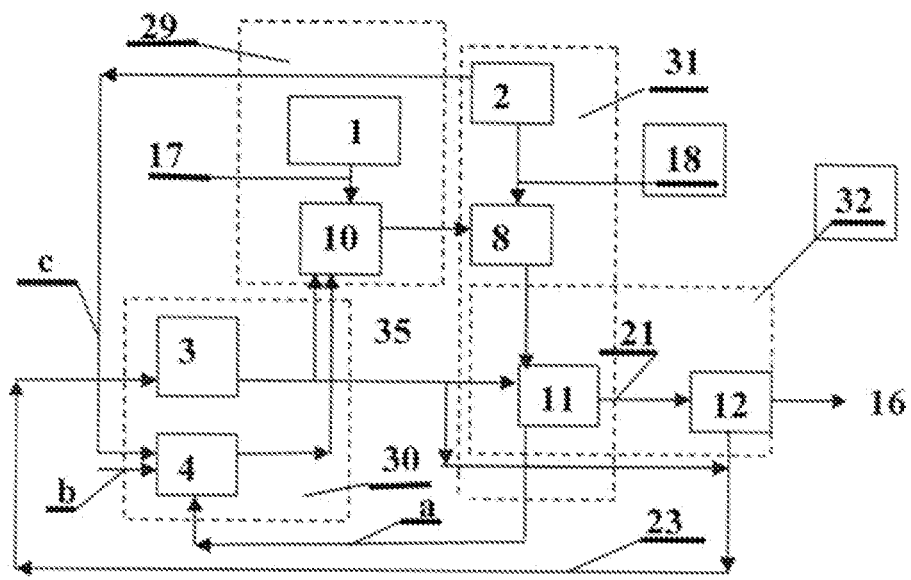
FIG. 1B shows block-diagram of the algorithm, realizing the method: detailed block-diagram with basic elements.

The essence of method is shown in the block-diagram of algorithm its realization (FIG. 1).

The method includes (FIG. 1A) a fire torch forming and providing of technological burning (30) for heating components and mixture in the technological cylinder (35).

To provide the process realization, and a claimed technical problem decision it envisage separation of the technological streams with separate supply (17-18) components—water (1) and the hydrocarbon component (2).

Water is supplied for heating and vaporization (29) for subsequent steam supply (19) for mixing with the hydrocarbon component and subsequent heating of the steam and hydrocarbon mixture (31), which already at this stage may be a flammable mixture.

This mixture is used during start-up of system (22). Then, the mixture is sent to the next stages of processing (32)—for additional warmup (20-21). The resulting fuel is sent to the system inlet for ignition (23), it used also to create a working torch at the setup outlet.

Heating of components and mixture (35) in normal mode is carried out by means of technological cylinder, having several sections, according to the stages number for implementing of the method.

Figure 2:
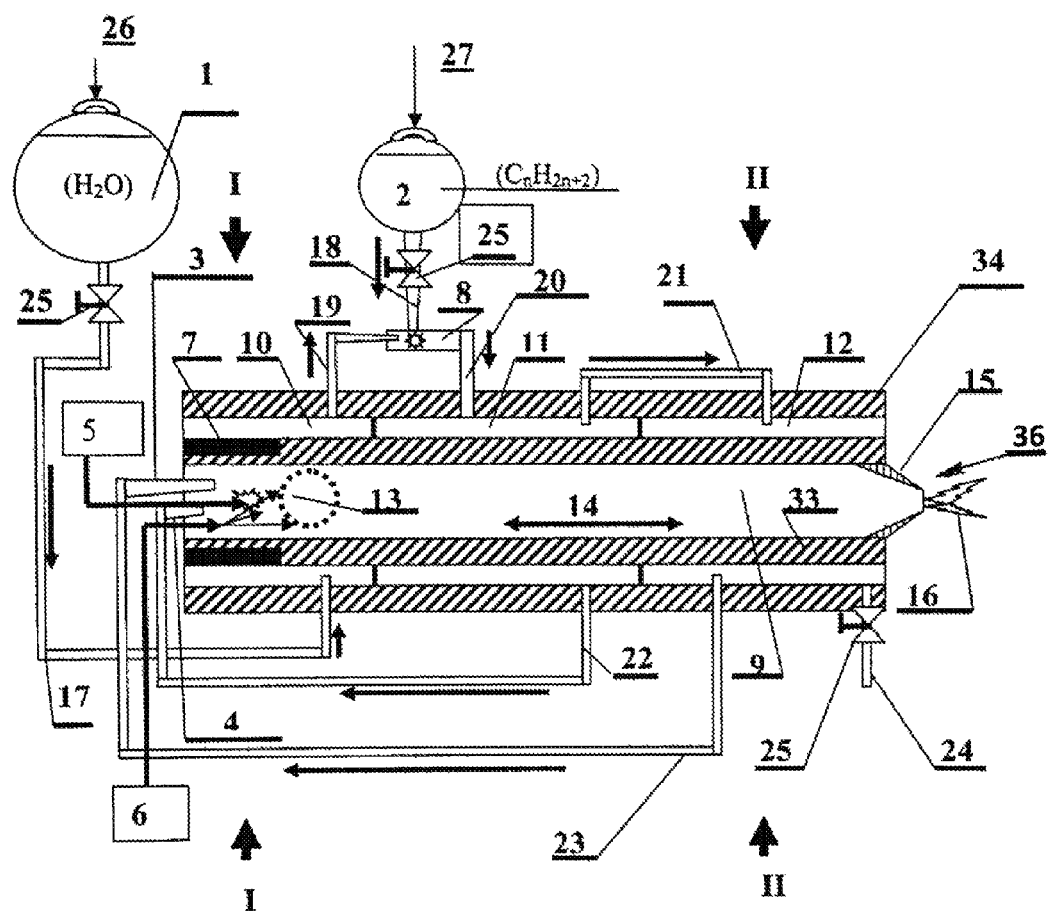
FIG. 2—shows the scheme of three-section thermal gas-generator setup.
Figure 3:
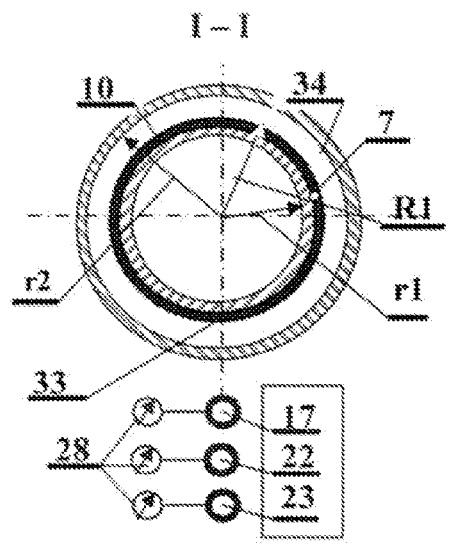
FIG. 3—shows profile I-I in FIG. 2.
Figure 4:
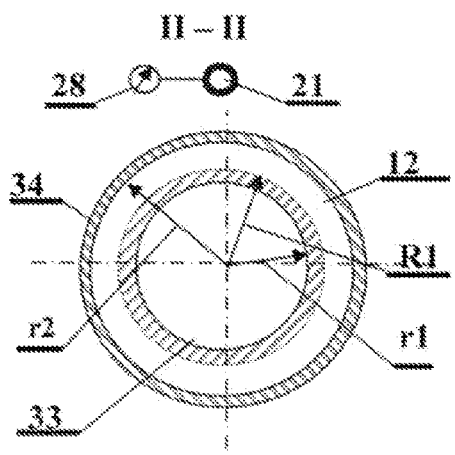
FIG. 4—shows profile II-II in FIG. 2.

Components—water and hydrocarbon component are loaded into sealed containers (1, 2) under the constant pressure of 0.3-0.5 MPa to ensure their uninterrupted supply to the system by pumping through control valves (25) (FIG. 1A, FIG. 2). Loading can be carried out periodically, as fast, as component discharge, or continuously.

Because the basis is taken in a three-stage process, in the first stage in the normal mode of self-heating, water is heated up to superheated steam with temperature of 500-550° C., and in the start-up mode with forced heating up to temperature of 450-500° C.

Figure 5:
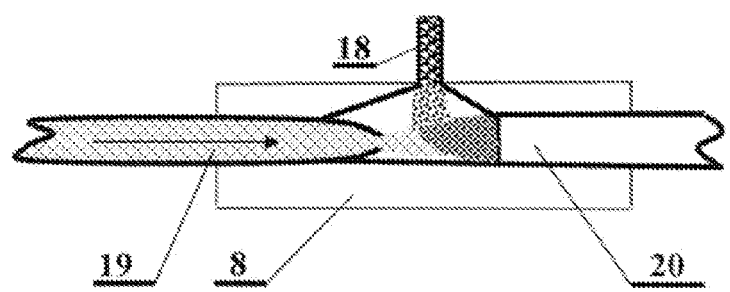
FIG. 5—shows scheme of injection type mixer.

The resulting superheated steam is directed to the mixing with the hydrocarbon components. Mixing is provided by injection (8) of steam (FIG. 5).

Then the steam and hydrocarbon mixture is additionally heated in the second section of the technological cylinder (11) and in the third section (12) mixture is heated up to a temperature of formation of gaseous fuel, which in the normal mode of self-heating is directed to return (23) for igniting and flame torch formation.

In the start-up mode with forced heating (7) the steam and hydrocarbon mixture is directed (22) for ignition from the second section (11).

The efficiency of the method consists in increasing the stability of process of hydrogen-containing gaseous fuel and producing (with a significant reduction of failures number), a reduction of power consumption and hydrocarbon component discharge (increasing the value of indicator of water/diesel fuel ratio).

The table below shows the comparative characteristics of the known technical solutions and proposed method. These characteristics confirm the efficiency of proposed method and its possibility to solve the claimed technical problem.

TABLE

Example of a concrete implementation of the method and the technical characteristics of thermal gas generator plant, realizing the method

| Technical characteristic | Unit of measurement | Plant "Grantstroy" type VTPGU-1 series of 2009 (implementation of the prototype) | Plant "Grantstroy" type VTTGU-700 series of 2011 (implementation of the claimed solution) |
|---|---|---|---|
| discharge of Water H2O | liters per hour | 20-25 | 20-25 |
| Diesel fuel discharge in normal mode | liters per hour | 3.0-3.1 | 2.4-2.5 |
| Water/diesel fuel ratio | | (6.5:1)-(8.0:1) Average (7.25:1) (87.9:12.1)% | (8.0:1)-(10.4:1) Average (9.5:1) (90.5:9.5)% |
| Setup outer diameter | mm | 203 | 203 |
| Thermal power | Gcal | 1.0 | 1.0 |
| Average frequency of the flame failure on an operating time of 1,000 hours | Flame failure per hour | 0.1 | 001 |

Implementation of the Method

The method is implemented using the plant, including appropriate elements that are made as a single device, which has a complex multi section corpus, a burner system (30), the firing chamber (9), injection type unit for mixing the components (8), the puke ignition unit (5), pipes and start-up system, including start-up burner (4) with a supply of combustible fuel (a, b, or c).

The corpus 36 is made single as two cylindrical tubes, imbedded in one another (33, 34), with a gap, forming technological cylinder.

Technological cylinder is heated by the firing torch, it is divided on hermetically isolated sections (10, 11, and 12)—the section number corresponds to the stages number of the fuel mixture making process.

The first section (10) corresponds to vaporization stage. This section is equipped with an independent induction source of heat (7) for realizing the start-up process.

The second plant part, corresponding to stage of components mixing and heating of a water steam and gas mixture, includes a section 11 of technological cylinder, injection type mixer (8).

The third section (12) serves for final warming-up of mixture and producing of fuel.

Inner tube cavity (9) with an inner diameter r1 forms the firing chamber of firing torch formation (13, 14) for the technological cylinder heating.

Unit for mixing (8), of the second stage, is made as an injector with a separate entries (19) for water, in the steam form, and hydrocarbon component (18).

The plant is equipped with fuel tanks, which are made as separate, sealed, discharge containers for water (1) and the hydrocarbon component (2).

Discharge water container (1) is connected via pipe (17) to the inlet of the first section of the technological cylinder of vaporization chamber (10), the outlet of vaporization chamber is connected via pipe to the injector first inlet, the second inlet of which is connected to the hydrocarbon component discharge container, the injector outlet is connected via pipe to a section (11) for heating a steam and gas mixture, section (11) for heating a steam and gas mixture is connected via pipe (21) with a additional heating chamber (12) to form a fuel mixture, outlet this chamber is connected via pipe (23) to the inlet of the firing chamber (9), where the turbine burner system is installed, this system has ignition device with spark-ignition pulse source (5), working burner (3) start-up burner (4), on the firing chamber outlet is installed the working torch formation element (16), as a constrict unit, (15).

Ratio of radii of tubes, forming the technological cylinder for fuel mixture producing is:

$$0.3<(R1/r2)>0.1;$$

Where: R1—is the outer diameter of the inner tube,
r2—is the inner diameter of outer tube, At the turbine burner system inlet is installed turbocharger unit (6), and into the discharge containers (1.2) is maintained constant overpressure of 0.3-0.5 MPa.

Figure 6:
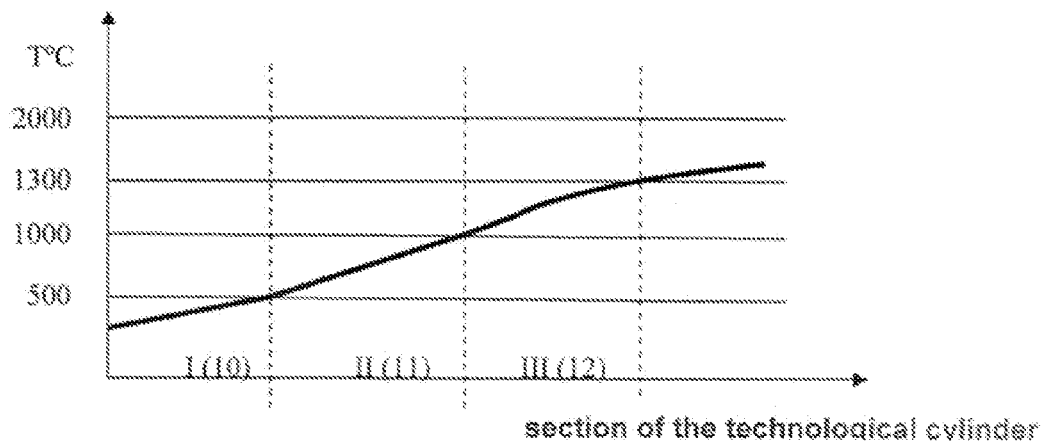
FIG. 6—shows thermal temperature regime in the technological cylinder.

The graph of FIG. 6 shows dependence of the temperature in the technological cylinder on its sections.

The invention claimed is:

1. A closed cycle thermal gas plant system for producing gaseous fuel that includes hydrogen, the system comprising:
    a corpus including an inner tube surrounded by an outer tube and a gap separating the inner tube and the outer tube, the gap having three isolated sections;
    a first of the three sections including a first induction source of heat configured to perform vaporization, a first inlet, and a first outlet;
    a unit configured to mix and heat a steam and gas mixture in a second of the three sections;
    a burner system configured to produce a fuel mixture formed in the third of the three sections, the burner system comprising a first start-up burner having an ignition device with a spark ignition pulse source, a firing chamber forming an inner tube cavity and a burner outlet;
    a pulse ignition unit; and
    a start-up system including a second induction source, a second start-up burner having a supply of combustible fuel, a discharge water container, a discharge hydrocarbon container, and an injector unit configured to inject and mix water as steam and hydrocarbon component and having a first injector inlet connected to the first outlet, a second injector inlet connected to one of the discharge containers, and an injector outlet connected to the second section;
    a firing chamber having a firing chamber inlet connected to the burner outlet, a firing chamber outlet, and a working torch forming a restriction device;
    wherein the discharge water container is connected to the first inlet,
    wherein the second section is connected to third section via pipe.

2. The thermal gas plant according to claim 1, wherein the inner tube and the outer tube each have a cylindrical shape and radius and wherein ratio
of radii of the inner and outer tubes, is:

$$0.3>(R1/r2)>0.1;$$

where R1—is an outer diameter of the inner tube,
r2—is an inner diameter of outer tube firing chamber.

3. The thermal gas plant according to claim 1 further comprising a turbo charging unit connected to the inlet of the burner system.

4. The thermal gas plant according to claim 1, wherein the discharging containers are sealed and a constant overpressure of 0.3-0.5 MPa is supported in the discharge containers.

5. The thermal gas plant system according to claim 1, wherein the first induction source and the second induction source are independent.

* * * * *